United States Patent [19]

Palmer

[11] 4,095,857
[45] Jun. 20, 1978

[54] OIL DEFLECTOR

[75] Inventor: Clifford Augustus Palmer, Huddersfield, England

[73] Assignee: Holset Engineering Company Limited, Huddersfield, England

[21] Appl. No.: 744,373

[22] Filed: Nov. 23, 1976

[30] Foreign Application Priority Data

Nov. 25, 1975 United Kingdom ............... 48324/75

[51] Int. Cl.² .................. F16C 1/24; F04B 39/04; F01M 11/04
[52] U.S. Cl. ..................... 308/168; 308/78; 308/121; 308/DIG. 15; 417/407; 184/6.11
[58] Field of Search ............... 308/121, 117, 116, 108, 308/DIG. 15, 168, 78, 170; 184/6.11, 13; 415/110, 111, 112; 417/407

[56] References Cited

U.S. PATENT DOCUMENTS

| 1,684,175 | 9/1928 | Eaton | 184/13 R |
| 2,040,924 | 5/1936 | Dolza | 308/78 |
| 3,494,679 | 2/1970 | Burdette | 308/168 X |

Primary Examiner—Robert B. Reeves
Assistant Examiner—Edward M. Wacyra
Attorney, Agent, or Firm—Gary M. Gron; Robert T. Ruff

[57] ABSTRACT

The disclosure illustrates an oil deflector which prevents lubricating oil from passing away from a turbocharger bearing assembly used to rotatably support the turbocharger shaft. The deflector comprises back to back circular dished members having a central aperture through which the shaft extends. The dished members form an outwardly facing channel which traps oil that has passed through peripheral slots in one of the dished members. A flinger on the shaft ajdacent the central aperture throws outward any oil that has passed through.

12 Claims, 4 Drawing Figures

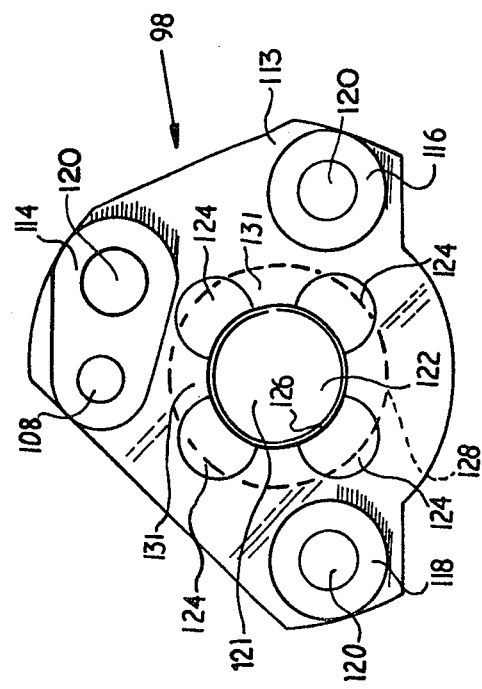
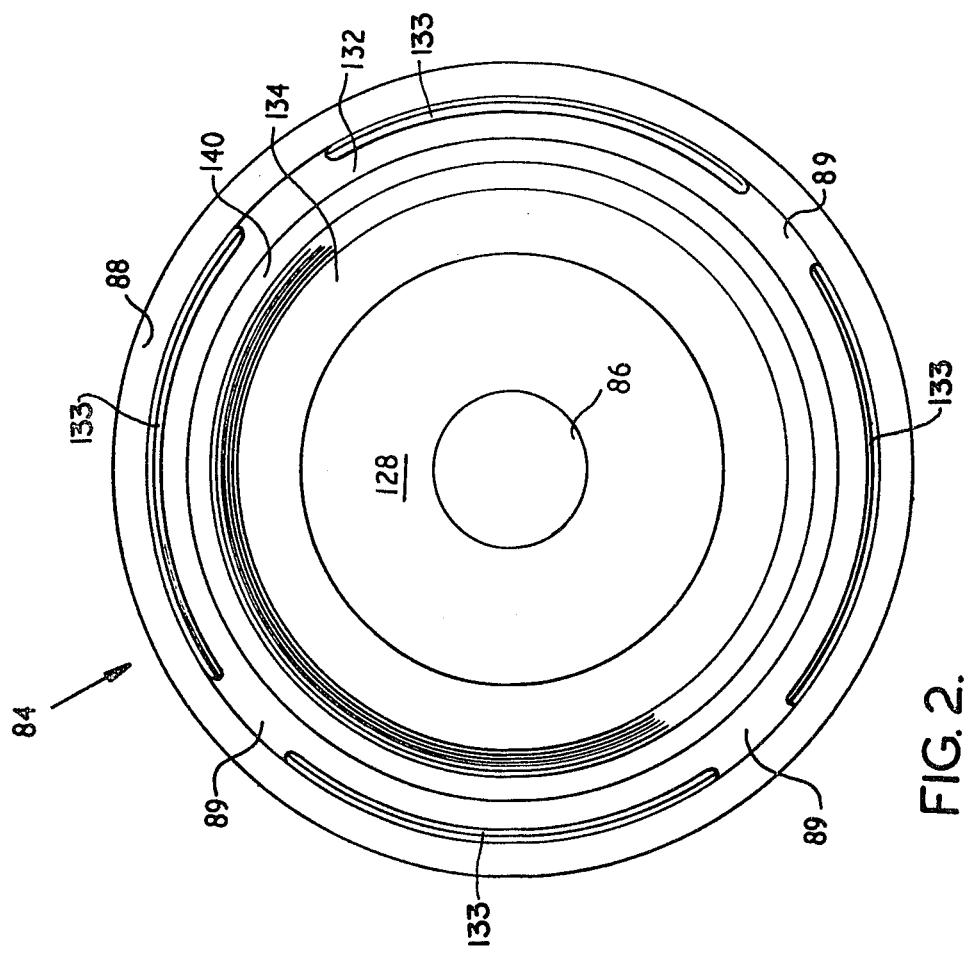

OIL DEFLECTOR

The present invention relates to rotatable assemblies and in particular to an arrangement for reducing the leakage of oil from such assemblies.

In rotating machinery it is normal to support a shaft for rotation by means of bearings to which oil under pressure is fed. To prevent difficulties created by oil passing into other parts of the machinery it is necessary to confine the lubricating oil to the bearing area before it is carried back to a reservoir or sump.

The present invention though applicable to rotatable assemblies generally is especially suitable for use in turbocompressors, e.g., gas turbine driven compressors used in super-charging internal combustion engines. In such machinery the lubricating oil must be prevented from entering the compressor or turbine chambers.

In many rotatable assemblies sealings means, e.g. one or more piston rings may be provided at the points where the shaft passes through the housing, but in many cases however leakage still occurs, particularly when internal pressure in the housing is higher than the external pressure.

According to the present invention there is provided an arrangement for reducing the leakage of oil from a rotatable assembly comprising a shaft rotatably supported by a bearing assembly located within a housing, said housing including a cavity surrounding a portion of the shaft and extending between said bearing assembly and an end wall of the housing through which the shaft extends, a flinger mounted on said portion of said shaft for rotation therewith, and an oil deflector located in said cavity, said oil deflector including an aperture through which said shaft passes and a channel opening into said cavity away from said shaft.

Fluid flow within the housing caused by equalization of pressure between the interior and the exterior of the housing causing leakage of oil will take place around the periphery of the oil deflector (i.e., in that part of the cavity occupied by air and oil foam) rather than between the shaft and the deflector where liquid oil may be lodged when such fluid flow is directed towards the exterior of the housing. Oil passing the deflector will tend to catch in the channel and be directed back to the sump. Any oil passing the channel will tend to be thrown outwards and away from the point where the shaft passes out of the cavity (where leakage may occur) by the flinger.

The oil deflector is preferably arranged so as to be stationary, i.e., so that it does not rotate with the shaft.

Preferably the oil deflector is dished on the side facing said bearing.

The oil deflector is preferably such that there is only a small clearance between the deflector and the shaft.

In one preferred embodiment the oil deflector comprises two dished annular members attached one to another in back-to-back relationship.

The oil deflector may be fixed in position in any convenient manner but in one preferred arrangement the deflector includes a web integral with the outer periphery of the deflector, the web being attached to the housing.

The present invention may, if desired, be used in conjunction with the invention described in copending U.S. application Ser. No. 744.374 filed simultaneously herewith.

The invention will now be further described by way of example with reference to the drawings accompanying the provisional specification, in which:

FIG. 2 is a view in the direction of Arrow A of one part of the arrangement of FIG. 1, and FIG. 3 is an end view also in the direction of Arrow A of another part of the arrangement of FIG. 1.

Figure 1:
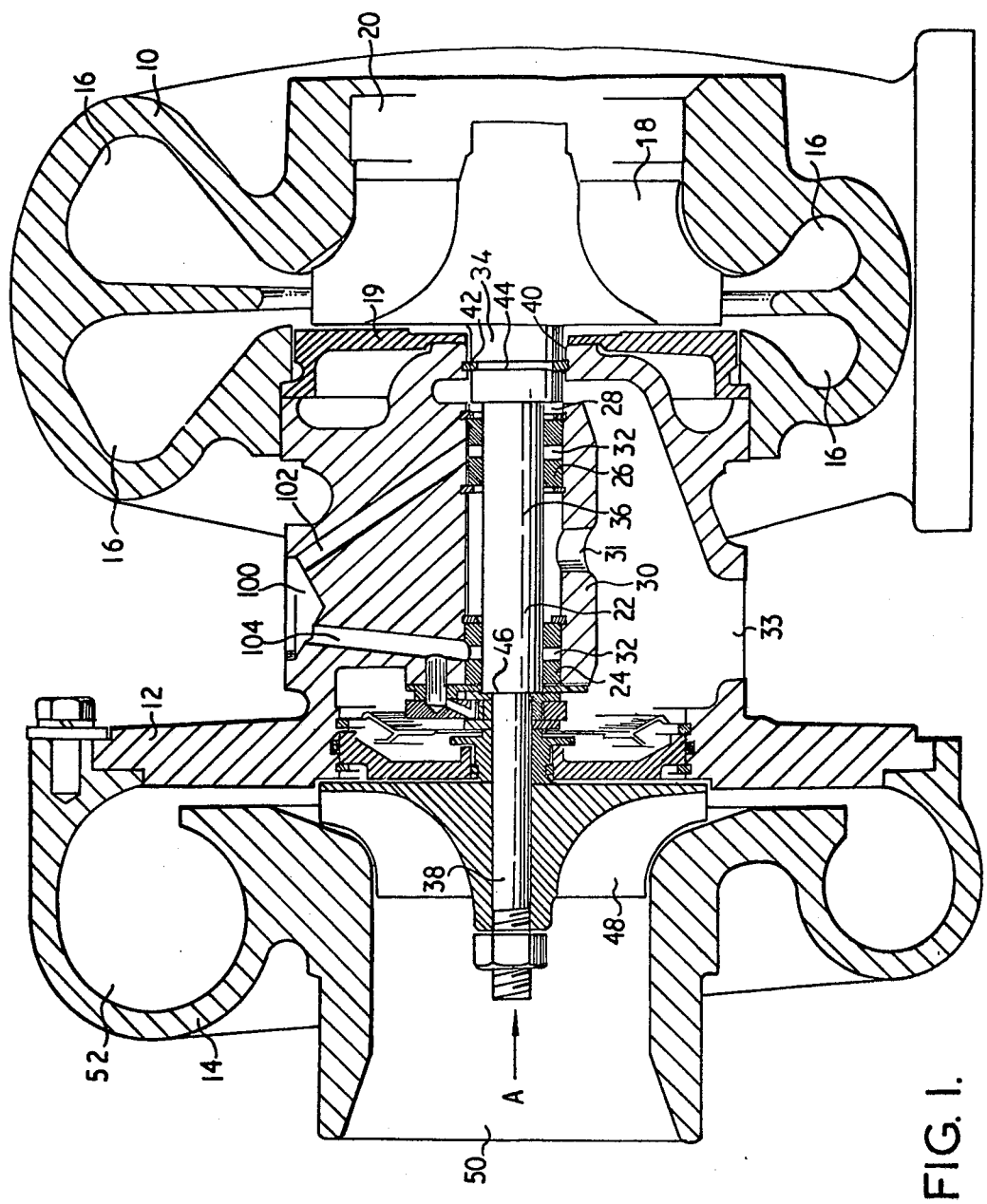
FIG. 1 is a cross section through a turbocompressor having a rotatable assembly incorporating an arrangement in accordance with the invention for reducing the leakage of oil.

Referring now to the drawings (initially FIG. 1), the turbocompressor shown includes a turbine housing 10, a bearing housing 12 and a compressor housing 14.

The turbine housing is of conventional construction and includes passageways 16 for receiving gas at a high energy level, e.g., exhaust gas from an internal combustion engine, and directing it to a turbine wheel 18 mounted for rotation within the turbine housing 10, and an outlet 20 for spent gases after passage across the turbine wheel 18. An annular back wall 19 for the turbine wheel 18 is sandwiched in position between the turbine housing 10 and the bearing housing 12. The turbine wheel 18 is integral with a shaft 22, which is rotatably mounted within the bearing housing 12 by means of a pair of rotatable sleeve bearings 24 and 26.

The bearings are mounted in an aperture 28 of circular cross-section formed in a bearing support 30 which is part of the bearing housing 12. Bearing support 30 includes a central oil drain 31 and each of the rotatable sleeve bearings 24, 26 includes a plurality of radial holes 32. A further oil drain 33 is provided in the bearing housing 12.

Figure 1A:
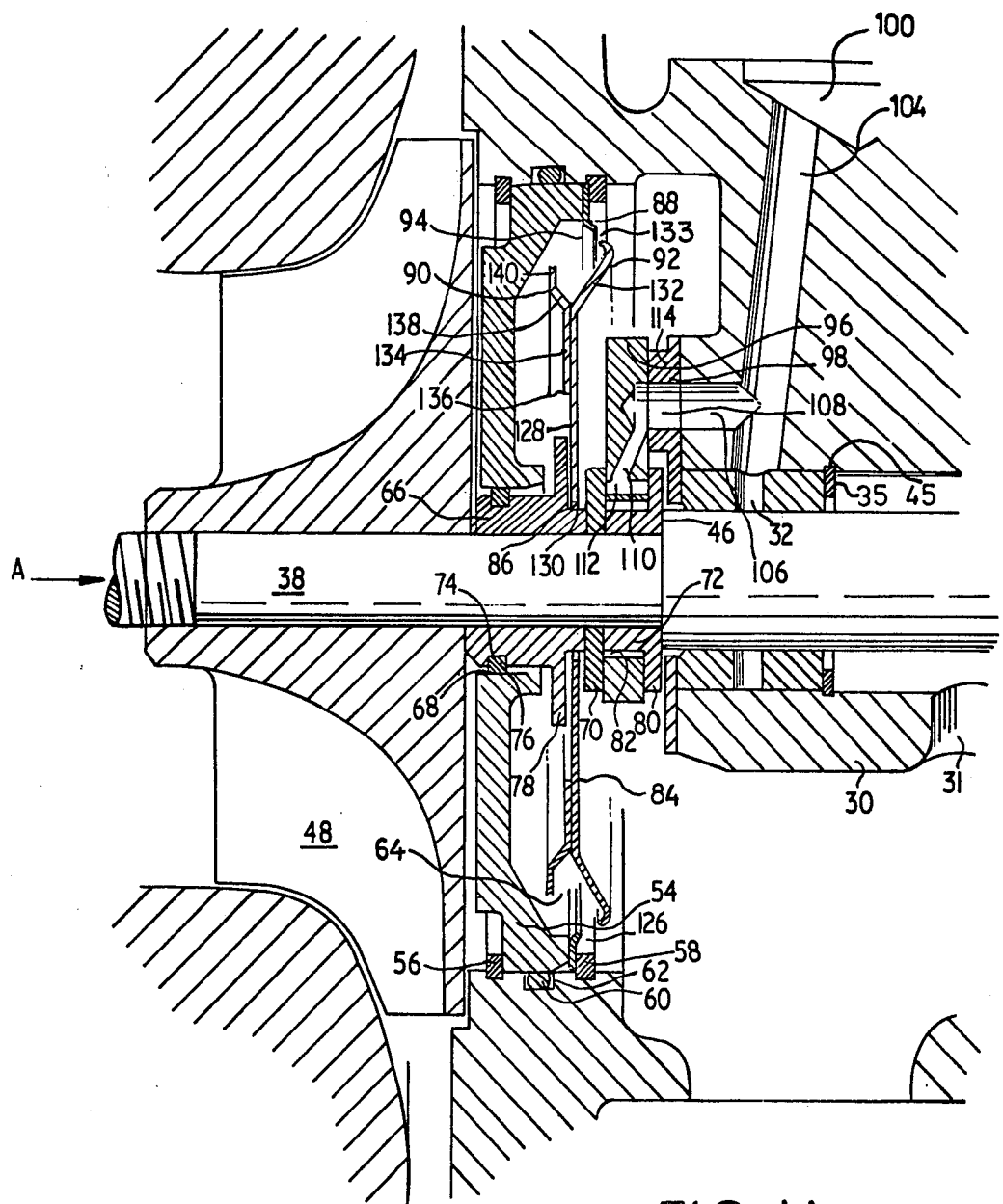
FIG. 1A is an enlarged fragmentary view of the turbocompressor of FIG. 1.

The shaft 22 comprises three sections 34, 36, 38 of differing diameters. The portion of largest diameter 34 passes through an aperture 40 formed in the bearing housing 12 and a seal is provided by a piston ring 42 located in a groove 44 in the portion 34 of the shaft. The portion of the shaft of intermediate diameter 36 extends through the rotatable sleeve bearings 24, 26 and terminates in a shoulder 46. Attached to the smallest diameter portion 38 of the shaft 22, for rotation therewith is a compressor wheel 48 which is located in the compressor housing 14. The compressor housing is of conventional design and includes an inlet 50 for gas and a passageway 52 of gradually increasing cross sectional area into which gas is directed by the compressor wheel 48. Reference should be made to FIG. 1A. A compressor back plate 54 is provided (which also acts as an end wall to the housing 12) and is held in position at its outer periphery by circlips 56, 58. A rubber O-ring 60 is located in a groove 62 and seats tightly against the outer diameter of the back plate 54.

A cavity 64 is defined between the back plate 54 and the bearing housing 12.

Disposed about the portion 38 of the shaft 22 for rotation therewith and sandwiched between the compressor wheel 48 and the shoulder 46 of the shaft 22 are a first sleeve 66 which extends through an aperture 68 in the backplate 54, an annular ring 70 and a second sleeve 72. The first sleeve 66 has an annular groove 74 therein. A piston ring 76 is disposed in the groove 74 and seats against the edge of the aperture 68. The first sleeve 66 includes a flange 78 disposed between the ends thereof and extending into the cavity 64, which flange acts as a flinger. The second sleeve 72 has a flange 80 disposed against the shoulder 46 and in combination with ring 70 forms an annular channel 82. Flange 80 and ring 70 together act as thrust bearings.

As shown in FIGS. 1A and 2, an oil deflector assembly 84 comprising first and second dished members 90, 92 attached one to the other in back-to-back relation is located in the cavity 64 with a large clearance 126 between the periphery of the oil deflector assembly and the inside profile of the cavity.

The first dished member 92 is formed with an annular flange 128 having a central aperture 86. The aperture 86 accepts a diameter 130 of the sleeve 66 with a small clearance. Integral with the annular flange and inclined at an angle from the outer diameter thereof is an annular wall portion 132. The annular flange and the annular wall portion together form a cup like or dished member with the open end of the cup or dish facing the bearing housing 12.

The second dished member 90 is formed with an annular flange 134 having a similar sized outside diameter to the annular flange 128 and a central aperture 136 which may be of any convenient size. Integral with the annular flange 134 and inclined from the outer edge thereof is an annular wall portion 138. Integral with the annular wall portion and extending radially therefrom is a further annular flange 140. The first and second dished members are attached one to the other in concentric and back-to-back relation. The inclined annular wall portions thus form an outwardly facing annular channel 94. The dished members may be attached to each other by riveting, spot welding or similar means through the annular flanges.

The oil deflector assembly 84 is located and held in position by an outer ring 88, which is sandwiched between the backplate 54 and the circlip 58, and a series of narrow webs 89 extending between the inner diameter of the outer ring 88 and the outer edge of the wall member 132 across the clearance 126. Conveniently the first dished member 92, the outer ring 88 and the webs 89 may be formed as a one-piece pressing. The webs 89, outer ring 88 and wall member 132 define a plurality of apertures or slots 133, shown best in FIG. 2. It should also be noted that one of the apertures 133 is in the lowermost portion of the oil deflector assembly 84.

A thrust plate 96 is located in the channel 82 and is maintained in position by a bearing retaining plate and spacer 98 which also serves to retain the rotatable sleeve bearing 24 against axial movement towards the compressor end of the assembly. A circlip 35 located in a groove 45 in the aperture 28 of the bearing support 30 serves to retain the rotatable sleeve bearing against movement towards the turbine end of the assembly.

A recess 100 for connection with a source of oil under pressure (not shown) is formed in the bearing housing 12 and communicates via passageways 102, 104 in the bearing housing 12 with the rotatable sleeve bearings 24, 26 and via passageway 106 in the bearing housing 12, passageway 108 through the bearing retaining plate 98 and passageways 110, 112 in the thrust plate 96 with the thrust bearings formed by the ring 70 and the flange 80.

The construction of the bearing retaining plate and spacer 98 may be more clearly seen from a consideration of FIG. 3 in conjunction with FIG. 1A. The bearing retaining plate and spacer 98 is of approximately triangular configuration and includes a plate portion 113 and three integral bosses 114, 116 and 118. The three bosses abut the thrust plate 96 and serve to maintain it in position. They also serve to space the plate portion 113 from the flange 80. Apertures 120 extend through the plate 98 in the raised sections 114, 116 and 118 and allow the passage of three fixing screws (not shown) from the thrust plate 96 to the bearing housing 12. The oil passageway 108 can be clearly seen from FIG. 3 to extend through the raised section 114. Centrally of the plate 98 is an aperture 121 comprising a central circular aperture 122 and four equally spaced apertures 124 each partially overlapping with the aperture 122. The inner and outer diameters of the sleeve bearing 24 are shown in FIG. 3 by the numerals 126 and 128 respectively. The number 126 also corresponds to the position of the shaft and it can be seen that the aperture 121 is designed such that fingers 131 extending between the apertures 124 will serve to retain the bearing 24 in place but that communciationis provided from the bearing to the cavity 64 on the opposite side of plate 98.

The total area of said fingers 131 which are in contact with the rotatable sleeve bearing 24 is not greater than and closely approximates to the area of contact between the rotatable sleeve bearing 24 and the circlip 35.

In operation of the turbocompressor exhaust gases are fed through passageways 16, into the turbine rotor 18 and then through outlet 20. The turbine wheel 18 is thus caused to rotate thereby causing shaft 22 and compressor wheel 48 to rotate.

In operation of the turbocompressor, oil under pressure is fed from recess 100 through passages 102 and 104 to the periphery of the rotatable bearing sleeves 24 and 26 and to the bores of the bearing sleeves via the apertures 32. The pressurized oil is then forced through the clearance spaces between the rotatable sleeve bearings and aperture 28 in the bearing support 30 and through the clearances between the rotatable sleeve bearings and the shaft 22. In the case of the rotatable sleeve bearing 24, oil flowing through the peripheral clearance in the direction of the turbine end of the assembly escapes through the clearance between the circlip 35 and the adjacent end face of the bearing to the central oil drain 31. Oil flowing through the peripheral clearance towards the compressor end of the assembly passes into the clearance between the bearing retaining plate and spacer 98 and the adjacent end face of the bearing before escaping through the aperture 121 to the cavity 64. Any oil pressure build-up within the clearance space between the bearing retaining plate and the bearing which would force the bearing to the right as viewed in FIG. 1, and into contact with the circlip 35 is avoided by the construction of the bearing retaining plate and spacer 98 in which the apertures 124 permit any oil pressure to be relieved into the cavity 64 through the gaps between the raised portions 114, 116 and 118.

During normal operation, rotation of compressor wheel 48 causes air to be drawn in through inlet 50 and compressed into passageway 52 from where it is led to the point at which it is required. Under certain operating conditions where the turbine is low the engine tries to aspirate more air than the compressor can provide and under such conditions pressures below atmospheric can exist in the compressor housing and in the area behind the compressor wheel. The pressure in the cavity 64 is normally around atmospheric or slightly above since it leads into the area of the oil drain 33 and a pressure differential may thus exist between the cavity 64 and the compressor side of the back plate 54 which tends to induce a flow of fluid from the cavity to the compressor side of the back plate 54. This flow of fluid would normally be in the region closest to the shaft and would cause oil from the bearings to be drawn into the compressor. The presence of the oil deflector 84 in this area closest to the shaft, however, will tend to cause any flow to be around outside of the deflector member rather than along the area closest to the shaft. The area at the outer periphery of the oil deflector will contain primarily air and oil foam rather than liquid oil thus minimizing the flow of oil towards the compressor. Any oil passing around the outer periphery of the oil deflector 84 will tend to be trapped in the channel 94 and will be directly downwardly, out of the channel 94 through the lowermost aperture 133 and through oil drain 33 to the oil sump (not shown). Furthermore, any oil which does pass through the central aperture 86 of the oil deflector together with any oil not trapped by the channel 94 will tend to be thrown outwardly away from the route to the compressor by the flinger 78.

It will be appreciated that many modifications of the device shown in the drawings may be effected and that the rotatable assembly of the invention in the form shown or in modified form may be used in machinery other than turbocompressors.

Having thus described the invention what is claimed as novel and desired to be secured by Letters Patent of the United States is:

1. An oil deflector for use with a horizontal shaft rotatably supported by at least one oil lubricated bearing assembly for rotation, said deflector comprising:
    a stationary member disposed generally in a plane at right angles to said shaft and having a first side thereof facing said bearing assembly, said member having a central aperture through which said shaft extends with a relatively close clearance and a plurality of apertures through said member at points spaced radially outward from said central aperture,
    means for defining an outwardly facing generally annular channel on the second side of said member and forming a perimeter around said central aperture but inward of said plurality of apertures for collecting and directing downward oil passing through said plurality of apertures,
    at least one of said apertures being formed at approximately the lowermost portion of said member for directing oil form said channel to the first side of said member.

2. Apparatus as in claim 1 wherein said bearing assembly is in a chamber and said deflector forms a wall of said chamber.

3. Apparatus as in claim 1 wherein said member comprises:
    a first dished member having the concave side thereof forming said first side, said first member having said plurality of apertures formed around its periphery; and, a second dished member having the concave side thereof facing away from said bearing assembly, said second member being attached to said first member in back-to-back relationship thereby forming said outwardly facing channel.

4. Apparatus as in claim 3 wherein said second dished member has a smaller outer diameter than said first dished member thereby forming said channel inward from said plurality of apertures.

5. Apparatus as in claim 4 wherein said first dished member has a peripheral portion including a plurality of webs extending from the periphery of said dished portion radially outward and away from said bearing area, the spaces between said webs forming said plurality of apertures.

6. Apparatus as in claim 5 further comprising a flanged assembly mounted for rotation closely adjacent said central aperture on the second side of said member for throwing outward any oil that has passed through said central aperture.

7. The combination comprising:
    a housing forming a generally annular chamber;
    a shaft extending generally along the axis of said chamber;
    an oil lubricated bearing assembly positioned in said chamber for rotatably supporting said shaft;
    a stationary member disposed generally in a plane at right angles to said shaft and having a first side thereof facing said bearing assembly, said member having a central aperture through which said shaft extends with a relatively close clearance and a plurality of apertures through said member at points spaced radially outward from said central aperture,
    means for defining an outwardly facing channel on the second side of said member and forming a perimeter around said central aperture but inward of said plurality of apertures for collecting and directing downward oil passing through said plurality of apertures,
    at least one of said apertures being formed at approximately the lowermost portion of said member for directing oil from said channel to the first side of said member.

8. Apparatus as in claim 7 wherein said member forms a wall of said chamber.

9. Apparatus as in claim 8 wherein said member comprises:
    a first dished member having the concave side thereof forming said first side, said first member having said plurality of apertures formed around its periphery; and, a second dished member having the concave side thereof facing away from said bearing assembly, said second member being attached to said first member in back-to-back relationship thereby forming said outwardly facing channel.

10. Apparatus as in claim 9 wherein said second dished member has a smaller outer diameter than said first dished member thereby forming said channel inward from said plurality of apertures.

11. Apparatus as in claim 10 wherein said first dished member has a peripheral portion including a plurality of webs extending from the periphery of said dished portion radially outward and away from said bearing area, the spaces between said webs forming said plurality of apertures in line with said outwardly facing channel.

12. Apparatus as in claim 11 further comprising a flanged assembly mounted for rotation on said shaft closely adjacent said central aperture on the second side of said member for throwing outward any oil that has passed through said central aperture.

* * * * *